June 20, 1961  A. D. McDUFFIE  2,989,065
FUEL CONTROL UNIT FOR INTERNAL COMBUSTION ENGINES
Filed July 15, 1957  4 Sheets-Sheet 1

INVENTOR.
Archie D. McDuffie
BY
ATTORNEY.

June 20, 1961      A. D. McDUFFIE      2,989,065
FUEL CONTROL UNIT FOR INTERNAL COMBUSTION ENGINES
Filed July 15, 1957      4 Sheets-Sheet 2
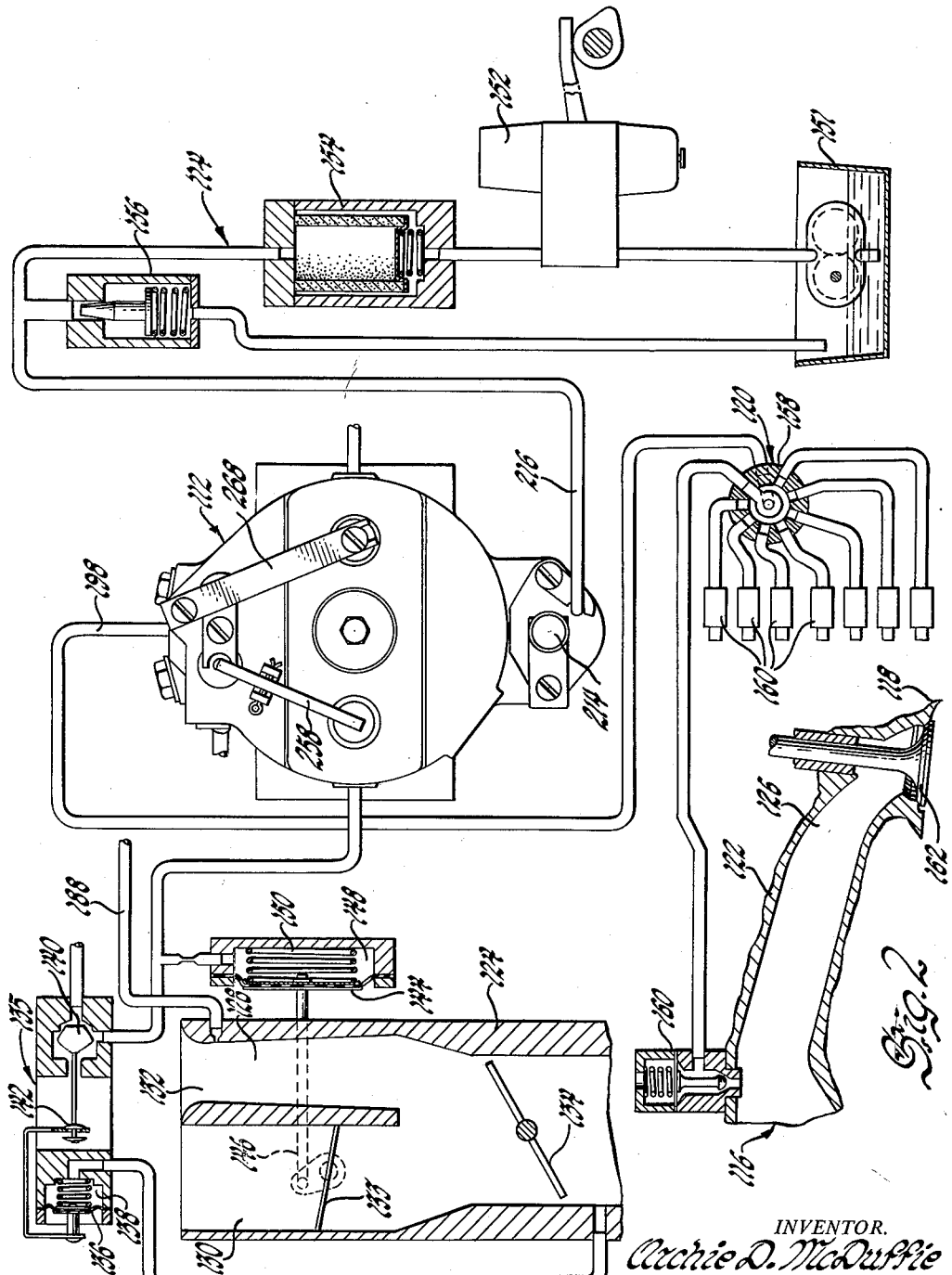
INVENTOR.
Archie D. McDuffie
BY
L. D. Burch
ATTORNEY.

June 20, 1961 A. D. McDUFFIE 2,989,065
FUEL CONTROL UNIT FOR INTERNAL COMBUSTION ENGINES
Filed July 15, 1957 4 Sheets-Sheet 3
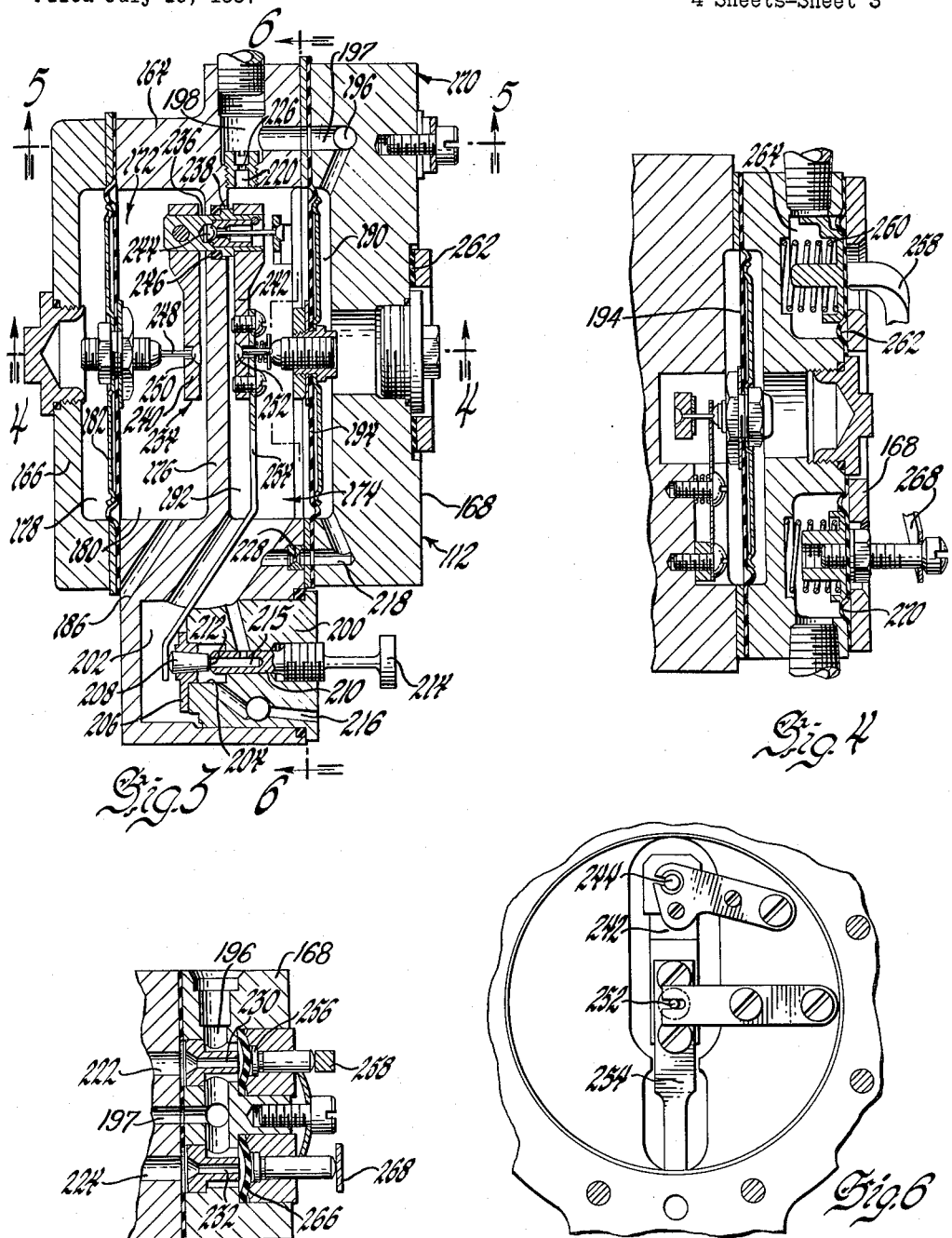
INVENTOR.
Archie D. McDuffie
BY
ATTORNEY.

June 20, 1961 A. D. McDUFFIE 2,989,065
FUEL CONTROL UNIT FOR INTERNAL COMBUSTION ENGINES
Filed July 15, 1957 4 Sheets-Sheet 4

INVENTOR.
Archie D. McDuffie
BY
ATTORNEY.

United States Patent Office 2,989,065
Patented June 20, 1961

2,989,065
FUEL CONTROL UNIT FOR INTERNAL
COMBUSTION ENGINES
Archie D. McDuffie, Berkley, Mich., assignor to General Motors Corporation, Detroit, Mich., a corporation of Delaware
Filed July 15, 1957, Ser. No. 671,933
2 Claims. (Cl. 137—100)

The present invention relates to charge forming means for an internal combustion engine and more particularly to a fuel control mechanism therefor.

In a fuel injection system for an internal combustion engine of the spark ignited variety, the fuel flow is normally regulated in response to the air flow. This may be accomplished by providing a control unit having a pressure responsive means adapted to sense a pressure indicative of the fuel flow and a pressure responsive means adapted to sense a pressure indicative of the air flow and effective to regulate the fuel flow to maintain said pressures in some predetermined proportions. Normally, the pressure responsive means are a pair of interconnected diaphagms having the opposite sides exposed to air and fuel pressures. Since the diaphragms are exposed to different pressure media, it is necessary that they be in different sealed chambers and that the means for interconnecting the members be a mechanism passing through the seal. Heretofore, the movement of the mechanism through the seal has produced a frictional force that creates a hysteresis in the system and otherwise interferes with an arcuate metering of the fuel. In addition, the movement frequently causes the seal to develop leaks.

It is now proposed to provide a control unit that is particularly adapted to accurately meter the fuel flow in proportion to the air flow with a minimum amount of friction or hysteresis in the movement of the various moving parts thereof. This is to be accomplished by providing a housing having a pair of pressure responsive elements, such as diaphragms, that are disposed in separate chambers having fluid pressures therein that represent various operating conditions in the system. These diaphragms are operatively interconnected with each other by a pivotally mounted member so that the forces on the diaphragm will oppose each other and will be effective to adjust a fuel valve until the forces are balanced and the fuel and air are flowing in some predetermined proportions. More particularly, this member comprises a U-shaped yoke having the base thereof pivotally mounted on a partition located between the diaphragms and with the arms thereof engaging the diaphragms. It may be seen that since the pivot point is located remote from the line of action, the forces on the diaphragm can operate through a considerable distance while the amount of movement at the pivot point will be very small. This will permit an effective seal to be provided between the chambers containing the arms. Due to the relatively small amount of work at this point, the seal can be very effective without creating frictional loading and the hysteresis will be reduced to a minimum.

In the drawings:

FIGURE 2 is a diagrammatic representation of another fuel injection system employing a control unit embodying a modification of the present invention.

FIGURE 3 is a transverse cross-sectional view of the control unit in FIGURE 2.

FIGURE 4 is a cross-sectional view taken substantially along the plane of line 4—4 in FIGURE 3.

FIGURE 5 is a fragmentary cross-sectional view taken substantially along the plane of line 5—5 in FIGURE 3.

FIGURE 6 is a fragmentary cross-sectional view taken substantially along the plane of line 6—6 in FIGURE 3.

Figure 1:
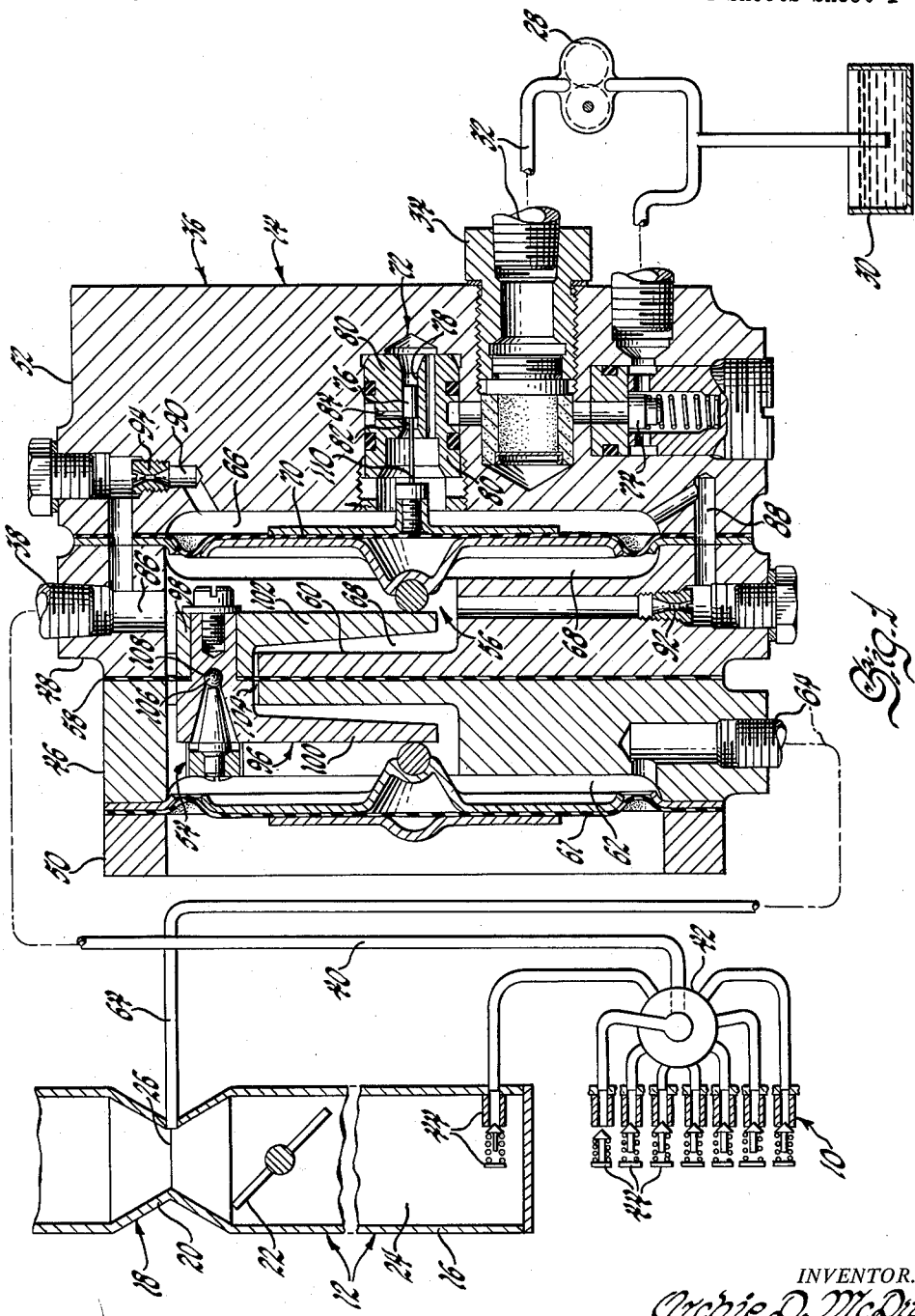
FIGURE 1 is a diagrammatic representation of a fuel injection system employing a fuel control unit embodying the present invention and shown in cross section.
Figure 7:
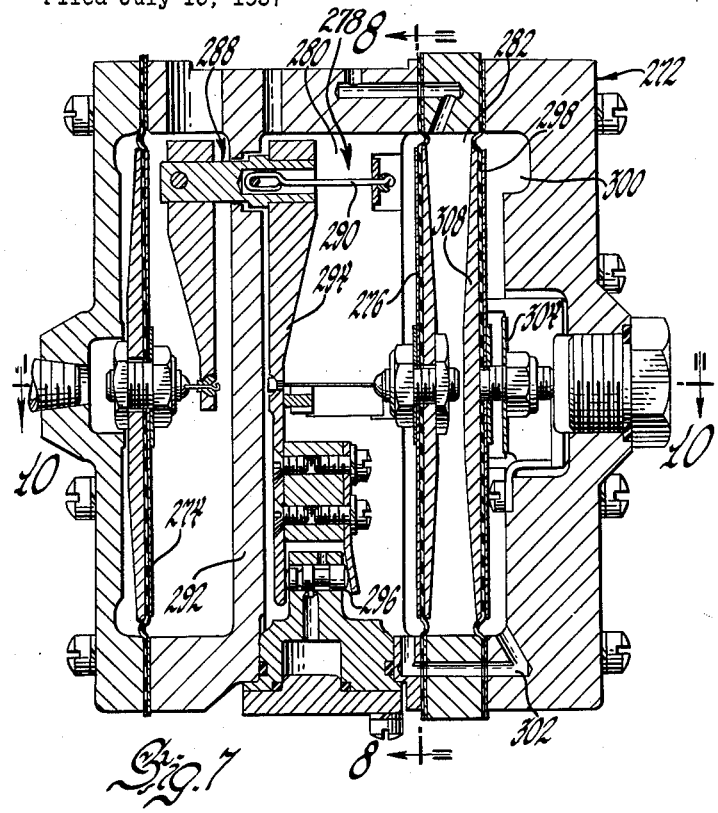
FIGURE 7 is a transverse cross-sectional view of another embodiment of the control unit.
Figure 9:
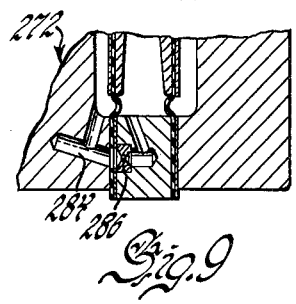
FIGURE 9 is a fragmentary cross-sectional view taken substantially along the plane of line 9—9 in FIGURE 8.
Figure 8:
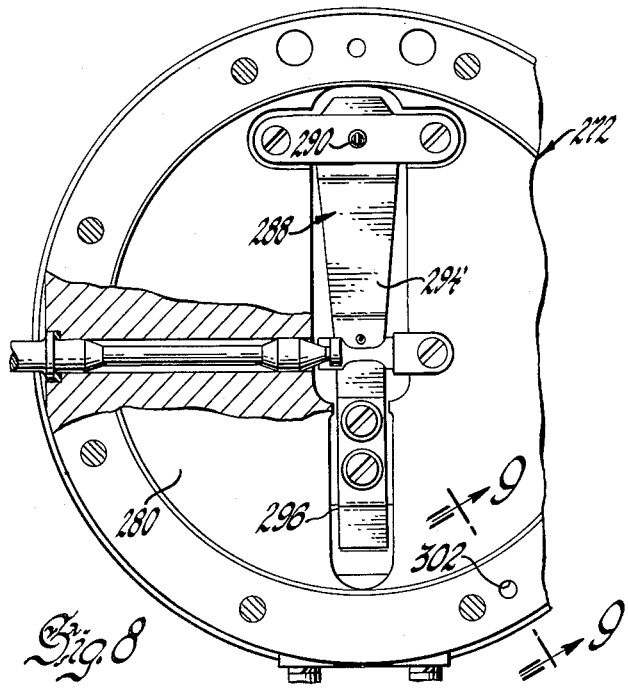
FIGURE 8 is a cross-sectional view taken substantially along the plane of line 8—8 in FIGURE 7.
Figure 10:
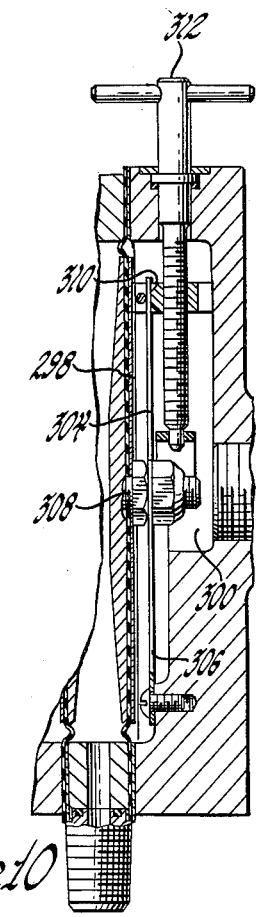
FIGURE 10 is a fragmentary cross-sectional view of the control unit taken substantially along the plane of line 10—10 in FIGURE 7.

Referring to the drawings in more detail, the present invention may be adapted to be employed on an internal combustion engine 10 of the spark ignited variety having an induction system 12 and a fuel injection system 14.

The induction system 12 includes an intake manifold 16 having an air intake 18 mounted thereon. The intake 18 includes a venturi 20 and a throttle valve 22 located downstream thereof for regulating the volume of the air flowing through the engine 10. The downstream end of the intake 18 communicates with the induction passages 24 of an intake manifold 16 which, in turn, distribute the throttled air to the engine cylinders. The venturi includes a throat 26 of restricted area adapted to produce a vacuum signal indicative of the amount of throttled air.

The fuel injection system 14 includes a pump 28 that draws the fuel from the storage tank 30 and discharges it under pressure through a fuel line 32 attached to an inlet 34 in a control unit 36. An outlet 38 from the control unit 36 has another fuel line 40 attached thereto for discharging metered fuel into a rotary fuel distributor 42. This distributor 42 breaks the metered fuel flow into equal increments of fuel that are discharged from the nozzles 44 into the air in the induction passages 24.

The control unit 36 comprises a pair of center members 46, 48 and a pair of end members 50, 52 secured together to form a housing having an air compartment 54 and a fuel compartment 56. These compartments 54, 56 are separated from each other by a flexible seal 58 clamped inside a partition 60 formed by the two center members 46, 48. The air compartment 54 is divided by an air diaphragm 61 that is clamped in position by the end member 50. One side of the air diaphragm 61 is exposed directly to the atmosphere while the other side is exposed to the air pressure in the sealed vacuum chamber 62. This chamber 62 is operatively interconnected with the throat 26 of the venturi 20 by a vacuum line 64. As a result there will be a force on the air diaphragm 61 indicative of the amount of air flow. The fuel compartment 56 is divided into a high pressure fuel chamber 66 and a low pressure chamber 68 by a fuel diaphragm 70 that is clamped in position by the other end member 52.

The inlet 34, which has the supply line 32 connected thereto, is formed in the end member 52 and includes a metering valve 72 that opens directly into the high pressure fuel chamber 66 and a pressure check valve 74. This check valve 74 is spring loaded and is set to maintain a predetermined fuel pressure throughout the entire system by bypassing the surplus fuel for return to the storage tank 30 or pump inlet. The metering valve 72 includes a piston 76 that is slidably disposed in a bore 78 extending through the bushing 80 and opening into the high pressure fuel chamber 66. One end of the piston 76 is positioned to register with the port 82 formed by the passage 84. Thus by opening and closing the port 82 the piston 76 will be effective to meter fuel flow into the high pressure fuel chamber 66.

The outlet 38, which has the fuel line 40 connected thereto, communicates directly with the low pressure chamber 68 by means of an unrestricted passage 86 so that the fuel may flow freely therefrom.

The low pressure fuel chamber 68 is interconnected with the high pressure chamber 66 by one or more passages 88, 90 having calibrated metering restrictions 92, 94 therein so that the fuel may flow from one chamber to the other. By employing a pair of passages located at the highest and lowest points in the two chambers, the fuel will circulate through all portions of the chambers and thereby prevent any stagnant pockets for vapors, etc., to collect therein. As the metered fuel flows through the orifices 92, 94, it will produce a pressure differential indicative of the amount of fuel flowing therethrough. The higher upstream pressure will be present in the high pressure chamber 66, while the lower downstream pressure will be present in the low pressure chamber 62. Thus there will be a force on the fuel diaphragm 70 tending to move it toward the left as seen in FIGURE 1 and the magnitude of the force will be indicative of the amount of fuel consumed.

In order to operatively interconnect the air and fuel diaphragms 61, 70 together so that the forces thereon may interact with each other, a yoke 96 is provided that has a base 98 and a pair of parallel arms 100 and 102. The base 98 extends through an opening 104 in the partition 60 so that the two arms 100, 102 are disposed on the opposite sides thereof. The base 98 is mounted on a ball 106 and socket 108 with the arms 100, 102 thereof being attached to the diaphragms 61 and 70 so that movement of one diaphragm will be transferred to the other diaphragm by a swinging movement of the yoke 96 about the ball 106. The flexible seal 58 is attached to the base 98 to separate the air and fuel chambers 66, 68 from each other. Since the air and fuel pressures on the outboard sides of the diaphragms 61, 70 are greater than those on the inboard sides, the diaphragms will be forced against the arms 100, 102 and the forces will tend to oppose each other. In addition, it should be noted that the forces will force the diaphragms against the arms and it will not be necessary for the diaphragms to be rigidly connected to the arms.

The piston 76 of the fuel valve 72 is operatively interconnected with the fuel diaphragm 70 by a rigid pin 110 so as to move therewith. Thus if the fuel pressure differential is greater than the air pressure differential, the diaphragms 61, 70 and yoke 96 will move to the left so as to close the port 82 and decrease the fuel flow until the forces balance. In the event the reverse condition occurs, the valve 72 will move to the right and increase the fuel flow until the forces are balanced. Thus the air and fuel will be maintained in some predetermined portions at all times.

It is, of course, apparent that during the translatory movement of the fuel valve 72, the yoke 96 will pivot about the ball 106. This rotating movement of the yoke 96 will permit a considerable amount of movement of the diaphragms 61, 70 and the piston 76, while the amount of sliding movement occurring at the ball 106 will be only a nominal amount. As a result, the frictional losses occurring from the sliding contact and the movement of sealing diaphragm 58 will be comparatively small. Moreover, the forces producing the motion will be acting through the leverage of the arms. As a result the hysteresis of the control unit 36 will be negligible.

In addition to the foregoing system, the control unit 112 may be adapted for use in charge forming means 114 such as disclosed in FIGURES 2 to 8, inclusive. This charge forming means is substantially the same as disclosed and claimed in copending application Serial No. 634,915, Charge Forming Means, filed January 18, 1957, in the name of Archie D. McDuffie.

The charge forming means 114 includes an induction system 116 for supplying air to the engine 118 and a fuel injection system 120 for injecting metered fuel into the charge of air in the induction system 116. The induction system 116 includes an intake manifold 122 having an atmospheric intake 124 on the top thereof for drawing the air from the atmosphere and a plurality of induction passages 126 that communicate with the various engine cylinders for delivering the air thereto. The atmospheric intake 124 is of the compound type comprising a primary venturi 128 and a secondary inlet passage 130 in parallel thereto. The venturi 128 has a throat 132 of restricted area adapted to product a vacuum indicative of the amount of air flow therethrough. The volume of air flow through the induction system 116 is controlled by throttle valve means 134 disposed downstream of the junction of the venturi and the secondary inlet.

The secondary passage 130 is of substantially uniform diameter and free of any metering restriction therein. However, an auxiliary butterfly valve 133 is provided in this passage 130 so that it may be actuated independently of the throttle valve 134. Although the auxiliary valve 133 may be actuated by any suitable means, it is preferably actuated in response to a signal indicative of the amount of air flow so that during light loads the entire air supply will flow through the venturi 128, but during heavy loads the air flow may divide between the venturi 128 and the auxiliary passage 130. In the present instance the induction vacuum is employed for actuating the secondary valve 133. More particularly, this is accomplished by means of a trigger unit 135 having a diaphragm 136 that forms one wall of a chamber 138 operatively interconnected with the intake manifold 122 downstream from the throttle valve 134. The diaphragm 136 is operatively interconnected with a vacuum valve 140 by a lost motion connection 142 and is spring biased so that the valve 140 will be retained closed when the induction vacuum is more than some predetermined amount. A second diaphragm 144 is interconnected with the auxiliary valve 133 by a link 146 and forms a wall of a chamber 148 interconnected with the valve 140. When the air flow is low, the induction vacuum is high and the vacuum valve 140 is retained closed. Thus the spring 150 will retain the auxiliary valve 133 closed and all of the air will flow through the venturi 128. However, when the air flow increases until the induction vacuum decreases below a predetermined amount, the diaphragm 144 will open the booster vacuum valve 140. This will cause the booster vacuum to appear in the diaphragm chamber 148 and cause the diaphragm 144 to "snap" the auxiliary valve 133 completely open. Under these conditions the air flow will be divided between the venturi 128 and the auxiliary inlet 130.

Thus it may be seen that as the air flows through the restricted throat 132, it will develop a signal indicative of the air flow through the engine and the relationship of the vacuum signal to the total air flow will depend upon the position of the auxiliary valve 133.

The fuel injection system 120 for supplying the fuel to the charge comprises a fuel storage tank 151, a fuel pump 152 for forcing the fuel through the system 120, a filter 154, a pressure check valve 156 for regulating the fuel pressure in the system 120, the control unit 112 for metering the fuel in proportion to the air flow, a rotary fuel distributor 158 for breaking the metered fuel flow into equal increments and injector nozzles 160 for injecting the increments of fuel into the charge adjacent the intake valves 162.

As may be seen by reference to the cross-sectional view in FIGURE 3, the control unit 112 includes a center member 164 and a pair of end members 166, 168 that are secured thereto to form a housing 170 having an air compartment 172 and a fuel compartment 174. These compartments 172, 174 are separated from each other by a partition 176 extending transversely across the center member 164. The air compartment 172 is divided into a low pressure air chamber 178 and an atmospheric chamber 180 by an air diaphragm 182 stretched across one end of the center member 164 and clamped in position by the end member 166. The atmospheric chamber 180 is open to the atmosphere by a vent passage 186. The low pressure chamber 178 is interconnected with the throat 132 of the venturi 128 by a vacuum signal line 188. It may thus be seen that the pressure differential between the two air chambers 178, 180 will produce a force on the air diaphragm 182. This force will be indicative of the air flow and the relationship of the force to the air flow will be dependent on the position of the auxiliary valve 133 or in other words, the proportion of air flowing through the venturi 128.

The fuel compartment 174 is divided into a low pressure fuel chamber 190 and a high pressure fuel chamber 192 by a fuel diaphragm 194 stretched across the other end of the center member 164 and clamped in position by the other end member 168. The low pressure fuel chamber 190 includes an outlet passage 196 that terminates in a fitting having a metered fuel line 198 connected thereto. The line 198, in turn, is interconnected with the rotary fuel distributor 158.

The inlet to the high pressure chamber 192 comprises a bushing 200 that fits into an enlargement of a vertical passage 202 extending downwardly from the high pressure chamber 192. The bushing 200 includes an axial bore 204, the inner end of which is covered by a perforated plate 206. A plunger valve 208 is slidably disposed in the opening through the plate 206 so that one end thereof bears against the end of a threaded plug 210 and opens and closes an opening 212 into the passage 215 in the interior of the plug 210. This will regulate the flow of fuel into the passage 202. The threaded plug 210 may be adjusted to control the extent to which opening 212 may be closed. The outlet of the check valve 156 is interconnected with the space between the plate 206 and the end of the bushing 210, by a fuel supply line 216, and the interior 215 of the bushing 210 is interconnected with the passage 202 into the high pressure chamber 192. It will thus be seen that the movement of the plunger 208 relative to the end of the bushing 210 will form a metering valve which is effective to control the flow of fuel from the check valve 156 through the inlet and into the high pressure chamber 192.

The low and high pressure fuel chambers 190, 192 are interconnected with each other by one or more passages 218, 220, 222, 224 having calibrated metering restrictions or orifices 226, 228, 230, 232 therein. Thus after the metered fuel leaves the metering valve 208, it may flow from the high pressure chamber 192 through the orifices and into the low pressure chamber 190. During the process of passing through the orifices, the fuel flow will produce a presure drop or differential indicative of the amount of metered fuel. This will, in turn, produce a force on the diaphragm 194 indicative of the quantity of the fuel flow. The relationship of this force to the fuel flow will be proportional to the area of the orifices 226, 228, 230, 232.

In order to operatively interconnect the two diaphragms 182, 194 with each other, a yoke 234 is provided that has the base 236 thereof disposed in an opening 238 through the partition 176 and the arms 240, 242 thereof disposed in the low pressure air and fuel chambers 178, 190. The base 236 is pivotally mounted on a ball and socket connection 244 disposed in the plane of the partition 176. A flexible seal 246 is provided around the base 236 to seal the air and fuel chambers 178, 190 from each other without interfering with the movement of the yoke 234. One arm 240 of the yoke 234 is connected to the air diaphragm 182 by a pin 248 having a ball-socket joint 250 on the end thereof. The other arm 242 is connected to the fuel diaphragm 194 by a similar ball-socket connection 252. It should be noted that the forces on the diaphragms 182, 194 will bias the diaphragms apart and as a result will retain the ball-socket connections securely seated in position at all times. If one of the diaphragms 182 or 194 moves, it will cause the yoke to pivot about the ball joint and produce a similar movement on the other diaphragms 182 or 194. As a result the pressure forces on the two diaphragms 182, 194 will be interconnected in opposed relation.

The arm 242 of the yoke 234 in the fuel chamber has an extension 254 secured thereto that projects downwardly through the passage 202 so as to terminate adjacent the plunger 208 so that the head of the pin will bear against the end of the extension 254. Thus any unbalance of the forces on the diaphragms 182, 194 will cause the plunger valve 208 to move and regulate the fuel flow until the two forces are again in balance.

As previously pointed out, the metered fuel flowing from the high pressure chamber 192 to the low pressure chamber 190 must flow through one of the passages 218, 220, 222, 224 and the calibrated metering orifices 226, 228, 230, 232 therein. Normally all of the fuel will flow through only the primary orifices 226, 228 that are disposed on diametrically opposite sides of the chambers 190, 192. The effective area of these two orifices 226, 228 is matched to the characteristics of the venturi 128. Thus the forces produced by the fuel flow through the orifices 226, 228 and the air flow when the auxiliary valve 133 is closed will be suitable for actuating the fuel valve 208 and maintaining the air and fuel in some predetermined ratio; for example, the maximum economy ratio.

In addition to the primary metering orifices 226, 228, an auxiliary or secondary orifice 230 may be provided in parallel thereto. This secondary orifice 230 is in a separate passage 222 that interconnects the two fuel chambers 190, 192 and is controlled by a diaphragm valve 256. The diaphragm valve 256 is controlled by a lever 258 pivoted on the outside of the housing. One end of the lever 258 is biased toward the closed position by a spring 260 and is also attached to a diaphragm 262. The diaphragm 262 forms one wall of a chamber 264 operatively interconnected with the trigger unit 135. Thus the spring 260 will normally retain the valve 256 closed. However, when the trigger unit 135 opens the booster vacuum valve 140, the auxiliary valve 133 and the diaphragm valve 256 will simultaneously open. The air flow will then divide between the venturi 128 and the auxiliary passage 130 and the fuel flow will divide between the primary and secondary orifices 226, 228, 230. The effective areas of the secondary orifice 230 and primary orifices 226, 228 are matched to the characteristics of the induction inlet when the auxiliary valve 133 is open. In other words, when the auxiliary valve 133 is open and only a portion of the air is flowing through the venturi 128, the decreased force produced on the air diaphragm 182 will be opposed by a corresponding decreased force on the fuel diaphragm 194. As a result a maximum economy charge will still be provided.

In addition, a fuel power or economizer orifice 232 is provided in a separate passage 224 that interconnects the high and low pressure chambers 190, 192 with each other in parallel to the primary and secondary orifices 226, 228, 230. The flow through this orifice 232 is controlled by a diaphragm valve 266 actuated by one end of a lever 268. The opposite end of the lever 268 is operatively interconnected with a diaphragm 270 responsive to induction vacuum or any other suitable signal indicative of maximum power operation. When the engine is operating under fuel power conditions, the diaphragm 270 will rotate the lever 268 and open the valve 266 and allow fuel to flow through the economizer orifice 232. The added area of this orifice 232 will decrease the resistance to the flow of fuel from one chamber 190 to the other 192. As a result the fuel valve 208 will open slightly farther to produce the same force as is produced by the air flow. By a proper choice of orifice size, the increase will produce a rich mixture suitable for maximum power.

Another embodiment of the control unit 272 is disclosed in FIGURES 7 to 10. This control unit 272 is similar to the previous units in that it has an air diaphragm 274 with the opposite sides thereof exposed to atmospheric pressure and a venturi vacuum so as to produce a force thereon indicative of the air flow. In addition, a fuel diaphragm 276 is provided that divides a fuel compartment 278 into a high pressure fuel chamber 280 and a low pressure fuel chamber 282 that are interconnected by one or more passages 284 having calibrated orifices 286 therein so as to produce a force on the diaphragm 276 indicative of the fuel flow. The two diaphragms 274 and 276 are interconnected by a yoke 288 pivotally mounted on a pin 290 located in the plane of the partition 292 and having one arm 294 operatively interconnected with a piston type valve 296 which is effective to meter the fuel flow. It may thus be seen that this control unit 272 will be effective to meter the fuel flow in proportion to the air flow similar to the foregoing embodiments.

During normal operation the forces on the air and fuel diaphragms 274, 276 will cause the yoke 288 to move the metering valve so that the forces are balanced and the air and fuel are flowing in some predetermined proportions. In the event the air flow increases, the venturi vacuum will increase and the air diaphragm 274 will tend to move towards the left. Simultaneously therewith, the yoke 288 will swing about the pivot point and move the fuel diaphragm 276 to the left until the metering valve has opened sufficiently for the air and fuel flow to again be in the desired proportions. It should be noted that when the fuel diaphragm 276 moves to the left, the volume of the high pressure chamber 280 will tend to decrease and the volume of the low pressure chamber 282 will tend to increase. This has two undesirable effects. The fuel trapped in the high pressure chamber 280 delays the movement of the diaphragm 276 and a considerable portion of the metered fuel flowing from the high pressure chamber 280 to the low pressure chamber 282 will be employed to compensate for the changes in the volume of the chamber rather than being mixed in the charge. Consequently, when it is desired to increase the power from the engine, there will be a tendency for the fuel flow to increase slower than the air flow and, as a result, there will be a leaning out of the charge during acceleration. Conversely, when the air flow through the venturi decreases, the air and fuel diaphragms 274, 276 will tend to move to the right. This will increase the volume of the high pressure chamber 280 and decrease the volume of the low pressure chamber 282. As a result the fuel flow will decrease slower than the air flow and the decreasing volume in the low pressure chamber 282 will force a surplus of fuel to be discharged from the low pressure chamber 282 into the injection system. Accordingly, during deceleration there will be a rich mixture. Both of the foregoing conditions are undesirable.

In order to prevent this, one wall of the low pressure fuel chamber 282 is formed by a flexible diaphragm 298 that is disposed parallel to the fuel diaphragm 276. This diaphragm 298 is not rigidly connected to either of the other diaphragms 274 or 276 so that it is free to move relative thereto. The backside of the diaphragm 298 forms a flexible wall of a chamber 300 operatively interconnected with the high pressure fuel chamber by a fuel passage 302. A flexible leaf spring 304 is provided that has one end 306 connected to the housing, the center 308 to the diaphragm 298 and the other end to an adjustable support 310. The tension of this spring 304 is adjusted by screw 312 to bias the diaphragm 298 toward the fuel diaphragm 276.

When the flexible diaphragm 298 is present and the air flow increases, the fuel diaphragm 276 will move to the left. When this occurs the surplus fuel in the high pressure chamber 280 will flow through the passage 302 and into the chamber 300 behind the diaphragm 298. This will cause the flexible diaphragm 298 to move at substantially the same rate as the fuel diaphragm 276. As a result, the volume of the low pressure chamber 282 will remain constant and the air-fuel ratio will not be disturbed by movement of the diaphragms 274, 276. In the event the air flow decreases the diaphragms 274, 276 move to the right. The fuel trapped in the low pressure chamber 282 will force the diaphragm 298 to the right and the fuel trapped therebehind will flow through the passage 302 into the high pressure chamber 280. Thus the air-fuel ratio will remain substantially constant.

Various changes and modifications of the embodiments of the invention described herein may be made by those skilled in the art without departing from the spirit and principles of the invention.

I claim:

1. A control unit for a fuel injection system on an internal combustion engine comprising a housing having an air diaphragm and a fuel diaphragm, a partition disposed between said diaphragms to form an air chamber and a fuel chamber which are separated from each other by said partition so that the pressures therein will be effective to operate on said diaphragms, the opposite sides of said air diaphragm being adapted to be exposed to an air pressure differential, the opposite sides of said fuel diaphragm being adapted to be exposed to a fuel pressure differential, a yoke having a pair of arms respectively disposed on the opposite sides of said partition, said yoke including a base portion having an opening terminating in a socket, a ball member depending from said housing and extending within said yoke base opening and coacting with said socket to pivotally support said yoke, said diaphragms respectively engaging said yoke arms proximate the ends thereof remote from said base portion, a control valve slidably mounted in said housing proximate one of said yoke arm ends, said forces on said diaphragms being effective to pivot said yoke for actuating said control valve to regulate the flow of fuel until said forces are balanced.

2. A control unit for a fuel injection system on an internal combustion engine comprising a housing having an air diaphragm with air chambers on the opposite sides thereof and a fuel diaphragm with fuel chambers on the opposite sides thereof, a partition disposed between said diaphragms and separating one of said air chambers from one of said fuel chambers, a yoke having a pair of arms which are respectively operatively interconnected with said fuel and air diaphragms, said yoke including a base portion having an opening terminating in a socket, a ball member depending from said housing and extending within said yoke base opening and coacting with said socket to pivotally support said yoke, said diaphragms respectively engaging said yoke arms proximate the ends thereof remote from said base portion, a control valve slidably mounted in said housing proximate one of said yoke arm ends, the forces on said diaphragms will be effective to cause said yoke to pivot about said ball member and actuate said control valve to regulate the fuel pressure differential across said diaphragm until said pressure differentials are balanced.

References Cited in the file of this patent

UNITED STATES PATENTS

| | | |
|---|---|---|
| 2,042,300 | Forsberg | May 26, 1936 |
| 2,411,287 | Mock | Nov. 19, 1946 |
| 2,450,826 | Chandler | Oct. 5, 1948 |
| 2,450,833 | Lee | Oct. 5, 1948 |
| 2,455,344 | Waring | Nov. 30, 1948 |
| 2,641,237 | Deschampes | June 9, 1953 |